US006966309B1

(12) United States Patent
Roberts, Jr. et al.

(10) Patent No.: US 6,966,309 B1
(45) Date of Patent: Nov. 22, 2005

(54) IN-CYLINDER REBURN METHOD FOR EMISSIONS REDUCTION

(75) Inventors: Charles E. Roberts, Jr., Helotes, TX (US); Rudolf H. Stanglmaier, Ft. Collins, CO (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/914,753

(22) Filed: Aug. 9, 2004

(51) Int. Cl.[7] ....................... F02M 255/07; F02B 69/06
(52) U.S. Cl. .................................... 123/568.14; 123/21
(58) Field of Search ......................... 123/21, 64, 568.1, 123/568.14, 567, 90.15, 27 R, 295; 60/274, 60/278, 279, 281

(56) References Cited

U.S. PATENT DOCUMENTS 4,674,463 A * 6/1987 Duckworth et al. .......... 60/278
4,945,870 A * 8/1990 Richeson ..................... 123/21
4,984,426 A * 1/1991 Santi ........................... 60/281
5,016,599 A * 5/1991 Jubb ........................... 60/278
5,303,686 A 4/1994 Kanesaka
5,456,240 A 10/1995 Kanesaka
5,730,099 A 3/1998 Gillespie
5,749,334 A 5/1998 Oda
5,761,903 A * 6/1998 Straka ......................... 60/278
6,619,242 B2 * 9/2003 Kaneko ....................... 123/21
6,718,957 B2 * 4/2004 Kakuho et al. ........ 123/568.14
6,758,174 B1 * 7/2004 Fuerhapter ................... 123/64
2004/0173166 A1 * 9/2004 Kobayashi et al. ........... 123/21

* cited by examiner

*Primary Examiner*—Willis R. Wolfe, Jr.
(74) *Attorney, Agent, or Firm*—Gunn & Lee, P.C.; Ted D. Lee

(57) ABSTRACT

A method applicable to lean-burn combustion engines uses excess air from previous engine cycles in a reburning process to provide exhaust gases characteristic of stoichiometric combustion. Stoichiometric combustion products are particularly useful for use by conventional emissions after-treatment devices to reduce $NO_x$, CO, and unburned hydrocarbons carried in the exhaust stream.

6 Claims, 2 Drawing Sheets

IN-CYLINDER REBURN METHOD FOR EMISSIONS REDUCTION

BACKGROUND OF THE INVENTION

1. Technical Field

This invention relates generally to a method for processing exhaust gases discharged from lean-burn combustion systems, and more particularly to such a method in which products of combustion discharged from lean-burn combustion systems are discharged as products of stoichiometric combustion.

2. Background Art

The efficiency, power, and emissions characteristics of modern, reciprocating engines are a very strong function of the combustion system. There are two primary combustion systems in common use. Of these, the most common is the spark-ignited (SI) Otto-cycle engine, which derives its output power from the combustion of a pre-mixed, fuel-air-diluent charge by a propagating flame within the combustion chamber. In Si combustion systems, the balancing act of air and fuel is important, because its combustion occurs ideally at a single particular air/fuel ratio, the stoichiometric one of about 14:1 by weight. It can be finessed to run leaner, i.e., in lean- burn SI regimes of perhaps 30:1, but not without the complexities of direct injection and other tradeoffs. Spark-ignition engines generally suffer from low thermal efficiencies at light-to-part load, due to the necessity of throttling the airflow through the engine, to provide a means of load control. Additionally, the full-load efficiency and power of these engines suffers due to engine design and control limitations brought about by the possibility of high-load knock, or autoignition of the combustible gases within the combustion chamber. The compression ratio of these engines is lower than the optimum value for efficiency to avoid the knock problem. Additionally, the ignition timing for the combustion process is retarded from optimal values for efficiency to avoid knock and reduce $NO_x$ emissions. Increases in the efficiency of these engines have been accomplished utilizing lean-burn strategies with turbocharging. However, the knock problem persists and continues to limit the maximum efficiency of these engines.

Additionally, exhaust $NO_x$ reduction strategies, such as timing retardation, exhaust gas recirculation, lean $NO_x$ catalysts in selective catalytic reduction lead to further reductions in overall engine efficiency.

The second, predominant, conventional combustion system utilizes the diesel-cycle, which derives its power from compression ignition (CI) and diffusion burning of the fuel spray injected directly into a mixture of air and diluent gases. In controlling output from full power to idle, a CI combustion system continues to ignite at air/fuel mixtures of 100:1 in leaner, contributing to a diesel engine's light-load efficiency. Although diesel engines do not suffer from knock, a problem of SI combustion systems, the maximum fuel-to-air ratio is limited by the production of exhaust particulates. Additionally, because the diesel combustion flame spreads at nearly stoichiometric proportions, $NO_x$ production is high. Exhaust gas recirculation and late injection timing have been used to control in-cylinder $NO_x$ formation, but future $NO_x$ regulations may require additional $No_x$ reduction strategies, such as selective catalytic reduction or use of a lean-$NO_x$ catalyst. Legal restrictions of exhaust gas particulate levels generally require particulate aftertreatment devices, such as traps or particulate filters.

Lean-burn gasoline and Diesel engines offer the benefits of higher thermal efficiency, but suffer from difficulty with $NO_x$ emissions. Nitrogen is present in the air we breathe, and in the air that an engine consumes. Nitrogen does not burn, but it can oxidize at temperatures over 2500° F. Therefore, $NO_x$ formation is a problem associated with lean-burn combustion systems, both spark-ignited and compression ignition systems. Currently, the most promising technology for $NO_x$ reduction in lean-burn combustion systems is the use of a "Lean $NO_x$ Trap" (LNT) or a 3-way catalyst to reduce $NO_x$ while oxidizing unburned hydrocarbons. However, Three Way Catalysts require a continuous flow of stoichiometric combustion products and Lean $NO_x$ Traps require that products of stoichiometric combustion be passed through the catalyst periodically in order to regenerate the $NO_x$ trapping cites and convert the released $NO_x$ into $N_2$ and $CO_2$.

U.S. Pat. No. 5,749,334 granted May 12, 1998 to Hideyuki Oda, et al. for a *Control System and Method for In-Cylinder Injection Internal Combustion Engine*, is addressed to overcoming problems associated with lean-burn combustion systems. Oda, et al. uses control of fuel injection, ignition, and exhaust gas recirculation (EGR) rate to promote stable combustion in the engine. However, Oda does not provide a way to assure that the combustion products discharged as engine exhaust gases from the lean-burn combustion system, are products of stoichiometric combustion.

The present invention is directed to overcoming the problems associated with $NO_x$ production in lean-burn combustion systems. It is desirable to have a highly efficient in-cylinder method for processing the exhaust gases from lean-burn combustion systems in such a way that the processed gases exit the engine as products of stoichiometric combustion, which can subsequently be passed through a 3-way catalyst to reduce $NO_x$ while oxidizing unburned hydrocarbons, periodically used to regenerate a lean $NO_x$ adsorber.

The present invention advantageously provides a method to use excess air from previous engine cycles in a reburning process, within the combustion chamber, thus providing products of stoichiometric combustion for expulsion from the engine or for use by an emissions aftertreatment system.

SUMMARY OF THE INVENTION

In accordance with one aspect of the present invention, a method for discharging exhaust gases representative of stoichiometric combustion from the combustion chamber of a lean-burn combustion reciprocating engine includes introducing initial amounts of air and fuel into the combustion chamber with the initial amount of air being greater than the amount of air consumed in the combustion of the initial amount of fuel. The method further includes providing a primary combustion cycle in which the initial amounts of air and fuel are compressed and ignited, and determining the excess amount of air not consumed in the primary combustion cycle. The method also includes confining the products of combustion of the primary combustion cycle within the combustion chamber during one or more subsequent expansion and compression strokes of the engine in response to determining that an excess amount of air remains in the combustion products after ignition of the initial amounts of air and fuel. An additional amount of fuel is then introduced during at least one subsequent cycle. The excess amount of air and the additional amount of fuel are then ignited during the one or more subsequent combustion cycles during which the combustion products are confined within the combustion chamber until substantially all of the initial amount of air is consumed and the products of combustion confined within the combustion chamber are characteristic of products of stoichiometric combustion.

Other features of the present invention include simultaneously introducing a mixture of the initial amounts of air and fuel in the combustion chambers, or alternatively, separately introducing initial amounts of air and fuel into the combustion chamber.

Another feature of the method embodying the present invention includes discharging the combustion products characteristic of stoichiometric combustion from the combustion chamber and through a 3-way catalyst.

Yet another embodiment of the method embodying the present invention includes operating the engine at less than full load, determining the desired power output of the engine, and distributing the introduction of the additional amounts of fuel over a plurality of subsequent combustion cycles.

BRIEF DESCRIPTION OF THE DRAWINGS

A more complete understanding of the method and operation of the present invention may be had by reference to the following detailed description when taken in conjunction with the accompanying drawings, wherein.

DETAILED DESCRIPTION OF THE PREFERRED EMBODIMENT

Figure 1:
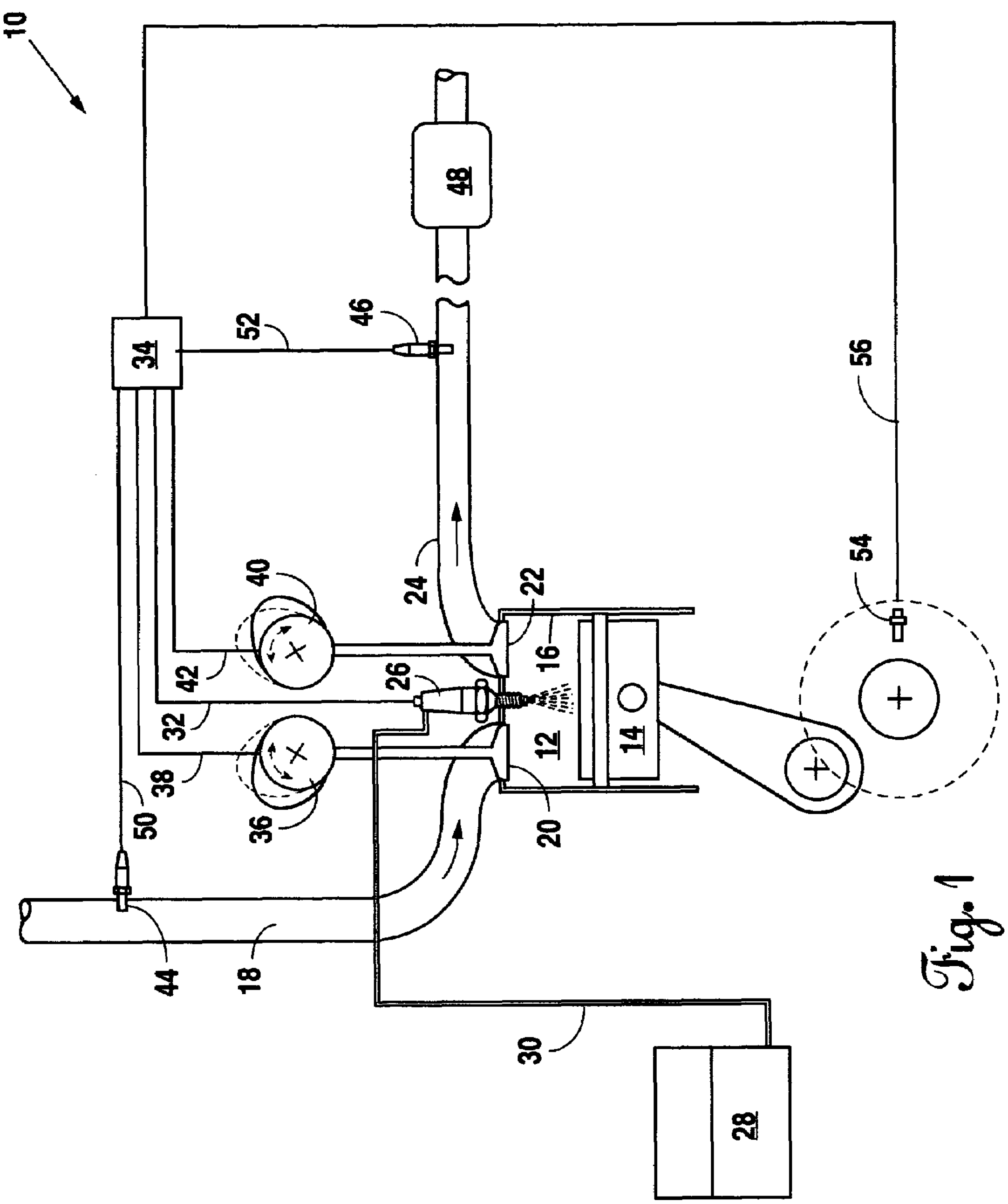
FIG. 1 is a schematic diagram of an apparatus suitable for carrying out the method for discharging exhaust gases representative of stoichiometric combustion in accordance with the present invention.
Figure 2F:
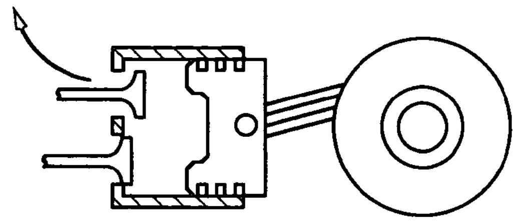
FIG. 2 is a schematic illustration of the several steps embodying the method for discharging exhaust gases representative of stoichiometric combustion from the combustion chamber of a lean-burn combustion reciprocating engine in accordance with the present invention.
Figure 2E:
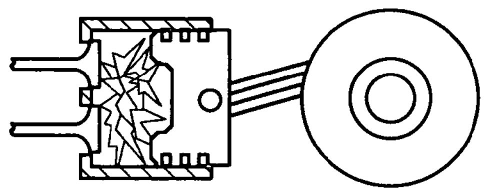
Figure 2D:
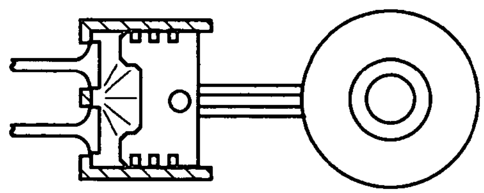
Figure 2C:
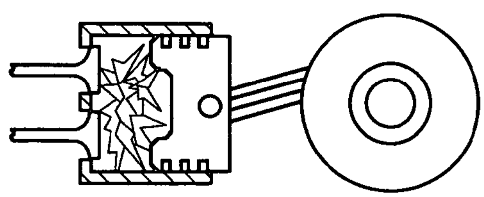
Figure 2B:
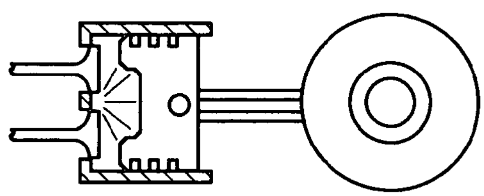
Figure 2A:
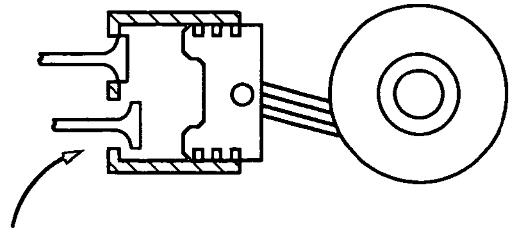

A lean-burn combustion reciprocating engine suitable for carrying out the method for discharging exhaust gases from the combustion chamber of such an engine is generally indicated in FIG. 1 by the reference numeral 10. The lean-burn combustion reciprocating engine 10 has at least one combustion chamber 12 having a piston 14 reciprocatably disposed in a cylinder 16. Air flow into the combustion chamber 12 is provided through an air intake system 18, for example, an intake manifold, which is in controlled fluid communication with the combustion chamber 12. The flow of intake air from the air intake system 18 into the combustion chamber 12 is controlled by an intake valve 20. The flow of exhaust gases, comprising the products of combustion produced in the combustion chamber 12 during operation of the engine, discharged from the combustion chamber 12 is controlled by an exhaust valve 22 providing controlled fluid communication between the combustion chamber 12 and an exhaust system 24 of the engine 10.

A fuel injector 26, having a nozzle portion disposed in direct fluid communication with the combustion chamber 12, is also in fluid communication with a source of fuel 28 by way of a fuel conduit 30. Typically, the fuel system includes a pump, not shown, for providing a pressurized flow of fuel from the fuel supply 28 to the fuel injector 26. The timing and duration of fuel injection into the combustion chamber 12 is controlled by a signal 32 delivered to the fuel injector 26 by a conventional programmable electronic engine control unit (ECU) 34.

The lean-burn combustion reciprocating engine 10 desirably has a conventional variable valve control system comprising a variable intake valve actuator (VIVA) 36 controlled by a signal 38 provided by the ECU 34, and a variable exhaust valve actuator (VEVA) 40 controlled by a signal 42 provided by the ECU 34. In carrying out the method embodying the present invention, the variable valve control system could alternatively be replaced by simple valve deactivators which maintain the valves 20, 22 in respective closed positions until reactivated.

The lean-burn combustion reciprocating engine 10 also may optionally include an intake airflow sensor 44, such as a manifold air pressure (MAP) sensor or a mass airflow sensor disposed in the air intake system 18. The engine 10 also desirably has an exhaust gas oxygen sensor 46, such as a universal exhaust gas oxygen (UEGO) sensor, disposed in the exhaust system 24 at a position between the combustion chamber 12 and a conventional 3-way catalyst 48 or other aftertreatment device such as a lean $NO_x$ adsorber requiring periodic regeneration by stoichiometric combustion exhaust products. Electrical signals 50, 52 provide data signals to the ECU 34 that respectively are representative of airflow through the air intake system 18 and the oxygen content of exhaust gases discharged through the exhaust system 24. A crankshaft position sensor 54 provides a crankshaft position signal 56 to the ECU 34.

In carrying out the method embodying the present invention, described below, the crankshaft position sensor 54, the exhaust gas oxygen sensor 46, and in some embodiments, the intake air flow sensor 44 provide electrical signals to the ECU 34. The ECU 34 is programmed in accordance with the below described method, to control fuel flow to the fuel injector 26 in accordance with the control signal 32, and respective operation of the intake and exhaust valves 20, 22 in accordance with the control signals 38, 42.

The lean-burn combustion reciprocating engine 10, illustrated in FIG. 1, is representative of a diesel engine, which as described above, typically operates unthrottled with more air passing through the engine than is normally consumed during combustion. Thus, diesel engines are inherently lean-burn combustion engines. The method for discharging exhaust gases representative of stoichiometric combustion is equally applicable to spark-ignition engines that operate in a lean- burn combustion mode. In such cases, the lean-burn combustion reciprocating engine 10 illustrated in FIG. 1 also includes a conventional sparkplug and a means for throttling intake air, such as a throttle plate disposed in the air intake system 18. Spark ignition provided by the sparkplug and operation of the intake air throttling device are typically respectively controlled by the ECU 34. Also, in lean-burn combustion spark-ignition engines, fuel may be injected directly into the combustion chamber 12, as illustrated in FIG. 1, or introduced into the air intake manifold 18 to form a pre-mixed air/vaporized-fuel charge, or a combination of both fuel introduction schemes.

A first preferred exemplary embodiment of the method for discharging exhaust gases representative of stoichiometric combustion is directed to application of the method to lean-burn spark-ignition engines. In this embodiment, primary spark ignition combustion is followed by one or more secondary, subsequent compression ignition combustion cycles. Power is delivered and extracted from both the primary and secondary combustion cycles. The primary combustion cycle exhaust gases are trapped in-cylinder and used as the oxidizer gases for the secondary combustion cycles. The amount of fuel supplied to the secondary combustion cycles varies according to the specific goals of the combustion application. For example, in accordance with the present invention, the secondary combustion cycle fueling is controlled so that the final exhaust gases correspond to products of combustion of a stoichiometric mixture. These products are then passed through a conventional 3-way catalyst to reduce oxidized nitrogen and oxidized carbon monoxide in unburned hydrocarbons.

A second preferred exemplary embodiment of the method for discharging exhaust gases representative of stoichiometric from the combustion chamber of a lean-burn combustion reciprocating engine is applied to a conventional lean-burn diesel engine. A primary compression ignition cycle is followed by one or more of secondary, subsequent compression ignition cycles. Power is delivered and extracted from both the primary and secondary combustion cycles. The primary combustion cycle exhaust gases are trapped in-cylinder and used as the oxidizer gases for the secondary combustion cycles. The amount of fuel supplied to the secondary combustion cycles varies according to the specific goals of the combustion application. For example, secondary combustion cycle fueling is controlled so that the final exhaust gases correspond to products of combustion of a stoichiometric mixture and are passed, for example, through a conventional 3-way catalyst to reduce oxidized nitrogen and oxidized carbon monoxide in unburned hydrocarbons.

The method for discharging exhaust gases representative of stoichiometric combustion from the combustion chamber of a lean-burn combustion Otto-cycle, i.e., spark-ignition, or diesel cycle, i.e., compression combustion, is illustrated pictographically in FIG. 2. Initially, the intake valve is in an open position and an initial amount of air, or a mixture of vaporized fuel and air, are introduced into the combustion chamber (a). The initial amount of air introduced in the combustion chamber is greater than the amount of air consumed in the combustion of the initial amount of fuel. As described above, air (a), or a pre-mixed charge of fuel and air (a), or direct fuel injection separate from the initial air charge (b), or a combination of both premixed air/fuel and direct injected fuel may be employed to form a combustible mixture in the combustion chamber. The intake valve is closed and the resultant air/fuel mixture in the combustion chamber is compressed and ignited (c) thereby providing a primary combustion cycle. As mentioned above, the primary combustion cycle may be either spark ignited when applied to spark-ignition engines or auto-ignited as a result of compression combustion in diesel engine applications.

After the primary combustion cycle (a,b,c), both the exhaust and intake valves remain closed during the subsequent expansion, or power, stroke of the engine. The excess amount of air not consumed in the primary combustion cycle is then determined based on the air intake flow signals, the amount of fuel delivered in the primary combustion cycle as determined by the ECU, by a model-based control algorithm programmed into the ECU, or by a feedback signal from the exhaust gas oxygen sensor representative of the oxygen content of a preceding combustion cycle.

The products of combustion of the primary combustion cycle (a,b,c) are confined within the combustion chamber, by maintaining the intake and exhaust valves in the closed position during at least one subsequent expansion stroke of the engine in response to determining that an excess amount of air remains in the products of combustion after combustion of the initial amounts of fuel and air. An additional amount of fuel is injected directly into the combustion chamber of the engine, as illustrated in step (d) and then ignited by auto-ignition as illustrated in step (e). The additional amount of fuel added during the subsequent cycle, or cycles (d,e), is controlled by the ECU to provide sufficient fuel so that substantially all of the initial amount of air introduced into the combustion chamber in step (a) is consumed and the products of combustion confined within the combustion chamber are characteristic of products of stoichiometric combustion. The requisite amount of fuel may be introduced in a single subsequent combustion cycle, or distributed over a plurality of combustion cycles, such as when operating in light or no-load duty cycles.

Following the air and/or air/fuel mixture intake (a) in the primary combustion cycle (a,b,c) and during each of the subsequent combustion cycles (d,e) both the intake valve and exhaust valve are maintained in a closed position and the products of combustion are thereby continually confined within the combustion chamber. After all of the initial amount of air introduced into the combustion chamber is consumed, and accordingly the products of combustion confined within the combustion chamber are characteristic of products of stoichiometric combustion, the exhaust valve is moved to an open position and the products of combustion are discharged from the combustion chamber (f). The discharged gases are characteristic of stoichiometric combustion, even though the engine is a lean-burn combustion engine. Accordingly, the exhaust gases can be passed through a 3-way catalyst whereby oxides of nitrogen ($NO_x$) are reduced and carbon monoxide (CO) is oxidized along with any unburned hydrocarbons remaining in the exhaust gases or, if desired, used to regenerate a lean $NO_x$ adsorber.

INDUSTRIAL APPLICABILITY

The present invention advantageously provides an in-cylinder method for efficiently processing the exhaust gases from any lean-burn combustion system, in such a way that the processed exhaust gases are delivered as stoichiometric products that can be further treated through use of a 3-way catalyst for the reduction of $NO_x$ and oxidation of CO and unburned hydrocarbons or periodically used to regenerate a lean $NO_x$ adsorber. The exhaust gas from the lean-burn combustion system is trapped in-cylinder through use of appropriate valve-timing during subsequent, secondary, compression ignited engine cycles, additional fuel injected, and trapped exhaust gas containing excess air used as an oxidizer for the added fuel. The number of secondary combustion cycles varies according to the amount of fuel added per secondary cycle and other operating parameters. The series of secondary combustion cycles are considered complete when the overall in-cylinder gas composition and thermodynamic state match the requirements of the engine operating condition or emissions aftertreatment device.

The present invention is particularly useful for providing a method of in-cylinder exhaust gas preparation so that the exhaust gas can be utilized to provide an optimized engine-out exhaust gas composition and thermodynamic state from lean-burn engine combustion engines. For example, the method embodying the present invention consists of utilizing one or more secondary combustion cycles to provide an engine-out exhaust gas composition that corresponds to exhaust from stoichiometric combustion. Such exhaust gases are suited for use with a conventional 3-way catalyst, or a lean $NO_x$ adsorber which requires stoichiometric combustion products for periodic regeneration. The high $NO_x$ content typical of lean-burn combustion can be effectively treated to reduce the amount of unburned hydrocarbons, CO, and $NO_x$.

Although the present invention is described in terms of preferred illustrative embodiments, those skilled in the art will recognize that variations on, or combinations of, the described embodiments can be made in carrying out the present invention. For example, sensors, other than those disclosed, that are adapted to sense selected engine operating parameters, may also be employed to deliver data signals to the programmable electronic engine control unit to provide control of fuel delivery, and operation of the intake and exhaust valves. Such arrangements embodying the present invention are intended to fall within the scope of the following claims.

Other aspects, features and advantages of the present invention may be obtained from the study of this disclosure and the drawings, along with the appended claims.

What is claimed is:

1. A method for discharging exhaust gases representative of stoichiometric combustion from the combustion chamber of a lean-burn combustion reciprocating engine, comprising:

introducing initial amounts of air and fuel into the combustion chamber of said lean-burn combustion reciprocating engine, said initial amount of air being greater than the amount of air consumed in the combustion of said initial amount of fuel;

providing a primary combustion cycle in which said initial amounts of air and fuel are compressed and ignited;

determining the excess amount of air not consumed in the primary combustion cycle;

confining the products of combustion of said primary combustion cycle within said combustion chamber during at least one subsequent expansion and compression stroke of said engine in response to determining that an excess amount of air remains in the products of combustion after the combustion of said initial amounts of air and fuel;

introducing an additional amount of fuel during at least one subsequent combustion cycle, igniting said determined excess amount of air and said additional amount of fuel during said at least one subsequent combustion cycle;

continuously confining the combustion products of said primary and said subsequent combustion cycles within said combustion chamber until substantially all of the initial amount of air introduced into said combustion chamber is consumed and the products of combustion confined within said combustion chamber are characteristic of products of stoichiometric combustion; and discharging said products characteristic of stoichiometric combustion from said combustion chamber.

2. The method for discharging exhaust gases representative of stoichiometric combustion from the combustion chamber of a lean-burn combustion reciprocating engine, as set forth in claim 1, wherein said introducing initial amounts of air and fuel into the combustion chamber of said reciprocating engine includes introducing a mixture of said initial amounts air and fuel into the combustion chamber of said engine.

3. The method for discharging exhaust gases representative of stoichiometric combustion from the combustion chamber of a lean-burn combustion reciprocating engine, as set forth in claim 1, wherein said introducing initial amounts of air and fuel into the combustion chamber of said reciprocating engine includes separately introducing said air and said fuel into the combustion chamber of said engine.

4. The method for discharging exhaust gases representative of stoichiometric combustion from the combustion chamber of a lean-burn combustion reciprocating engine, as set forth in claim 1, wherein said discharging said products of combustion characteristic of stoichiometric combustion from said combustion chamber includes passing the combustion products characteristic of stoichiometric combustion through a three-way catalyst.

5. The method for discharging exhaust gases representative of stoichiometric combustion from the combustion chamber of a lean-burn combustion reciprocating engine, as set forth in claim 1, wherein said discharging said products of combustion characteristic of stoichiometric combustion from said combustion chamber includes passing the combustion products characteristic of stoichiometric combustion through a lean $NO_x$ adsorber.

6. The method for discharging exhaust gases representative of stoichiometric combustion from the combustion chamber of a lean-burn combustion reciprocating engine, as set forth in claim 1, wherein said method includes:

operating said engine at less than full load;

determining the desired power output of said engine; and distributing the introduction of said additional amount of fuel over a plurality of subsequent combustion cycles, the respective amounts of fuel introduced during each subsequent combustion cycle, and number of said subsequent combustion cycles being at least partially dependant on the determined desirable power output of the engine.

* * * * *